United States Patent [19]
Weigert

[11] Patent Number: 5,088,812
[45] Date of Patent: Feb. 18, 1992

[54] HIGH-FREQUENCY MOVIE CAMERA

[75] Inventor: Dedo Weigert, München, Fed. Rep. of Germany

[73] Assignee: Dedo Weigert Film GmbH, Fed. Rep. of Germany

[21] Appl. No.: 673,943

[22] Filed: Mar. 22, 1991

[30] Foreign Application Priority Data

Mar. 30, 1990 [DE] Fed. Rep. of Germany ....... 4010282

[51] Int. Cl.$^5$ .............................................. G03B 41/04
[52] U.S. Cl. ..................................... 352/119; 352/105
[58] Field of Search ............... 352/119, 120, 113, 105, 352/106

[56] References Cited

FOREIGN PATENT DOCUMENTS 7715229 8/1977 Fed. Rep. of Germany .

Primary Examiner—Monroe H. Hayes
Attorney, Agent, or Firm—Woodcock Washburn Kurtz Mackiewicz & Norris

[57] ABSTRACT

A high-frequency movie camera has a sprocket wheel for supporting and transporting of a film. A rotating prism is positioned opposite to the perimeter of the sprocket wheel and is driven by the combination of a gear located on the sprocket wheel shaft and a pinion intermeshing with the gear and attached to the rotating prism shaft. In order to avoid moves caused by the necessary clearance between the gear and pinion, an electromagnetic brake is positioned on the rotating prism shaft, which is automatically controlled to limit the prism rotational speed.

6 Claims, 2 Drawing Sheets

HIGH-FREQUENCY MOVIE CAMERA

BACKGROUND OF THE INVENTION

The invention relates to a high-frequency movie camera comprising a sprocket wheel for supporting and transporting of a film and a rotating prism positioned opposite to the perimeter of the sprocket wheel, said rotating prism driven by a gear located on the sprocket wheel shaft and a pinion inter-meshing with the gear and mounted to the rotating prism shaft. Such a movie camera is known from the German utility model No. 77 15 299.

If there were no provision for clearance between the teeth of the gear and the pinion in such cameras, they would very quickly jam with resulting destruction of gear and pinion teeth due to the high speed and the necessarily very fast starting required in order to save film material. Therefore, a certain clearance between the teeth of both wheels has to be allowed. However, this clearance can lead to moves so that the picture "rides" when it is presented later, i.e., it moves up and down. Thus, the teeth of the gear and pinion can float within the limits of the clearances so that the pictures are not recorded on the film at exactly equal distances.

In order to overcome this difficulty, the sprocket wheel and the rotating prism could be driven separately. However, a lot of time passes until both driving mechanisms are synchronized to each other, and during this time film material would uselessly be wasted.

SUMMARY OF THE INVENTION

Thus, the underlying problem of the invention is to provide a high-frequency movie camera in which moves of the picture due to the clearance between the gear and pinion of the movie camera are avoided during later presentation of the film, i.e., the picture is stabilized.

This problem is solved by the high-frequency movie camera of the kind according to the invention that has an electromagnetic brake positioned on the rotating prism shaft for stabilizing the relation between the gear and pinion.

The shaft of the rotating prism is slightly slowed down relative to the shaft of the sprocket wheel by an electromagnetic brake so as to maintain the teeth of the pinion to constantly sit close to the flank of the appertaining tooth of the gear. By this control means, clearance movements of a tooth of the pinion between the flanks of the both nearby gear teeth are thereby avoided.

A magnetic brake is chosen in accordance with this invention which can be electrically remote-controlled. The brake can be switched off during the process of running up, i.e., starting, so that this process can be carried out without being hindered by the brake. Thus not only power, but also film material is saved to a considerable extent.

The provision of a brake control circuit makes it possible to slow down the pinion more or less rapidly, so that the movie camera can be ideally adapted to the given requirements. Thus, the braking torque can be adapted to the respective conditions encountered in operation, e.g., speed, environmental conditions, etc.

BRIEF DESCRIPTION OF THE DRAWINGS

The invention is explained with reference to the exemplary embodiment shown in the drawings, which comprise.

DESCRIPTION OF PREFERRED EMBODIMENT

Figure 1:
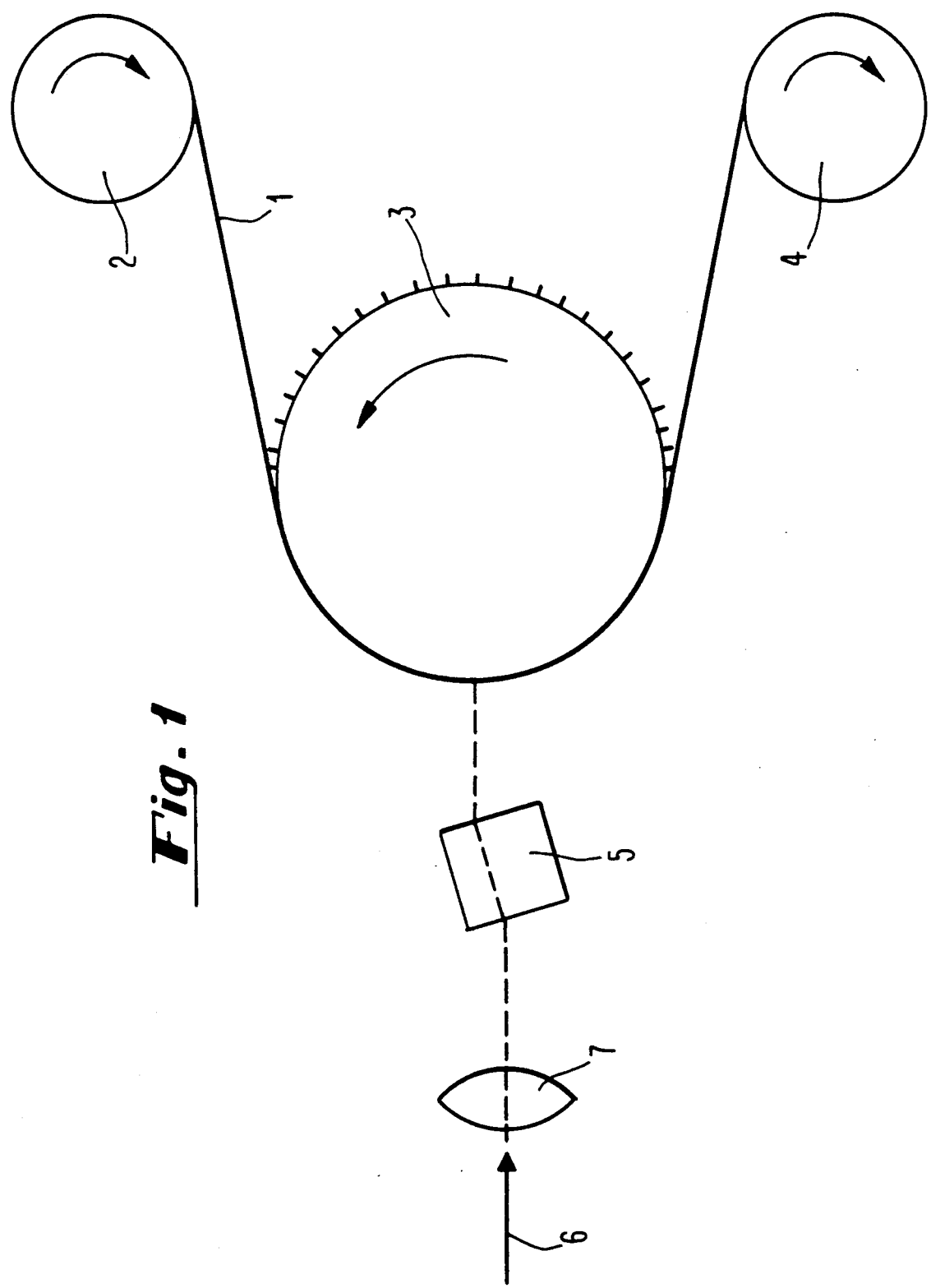
FIG. 1 shows a schematic side view of the film driving mechanism of a high-frequency movie camera.

As shown in FIG. 1, in the high-frequency movie camera the film 1 is led from a feed reel 2 via a sprocket wheel 3 to a take-up reel 4. A rotating prism 5 is positioned opposite to the perimeter of the sprocket wheel 3. Light, indicated by the arrow 6, passes through a lens 7, and is directed to the rotating sprocket wheel 3 so that individual pictures are produced one after the other on the film, as is the case in a more slowly intermittently operating camera.

Figure 2:
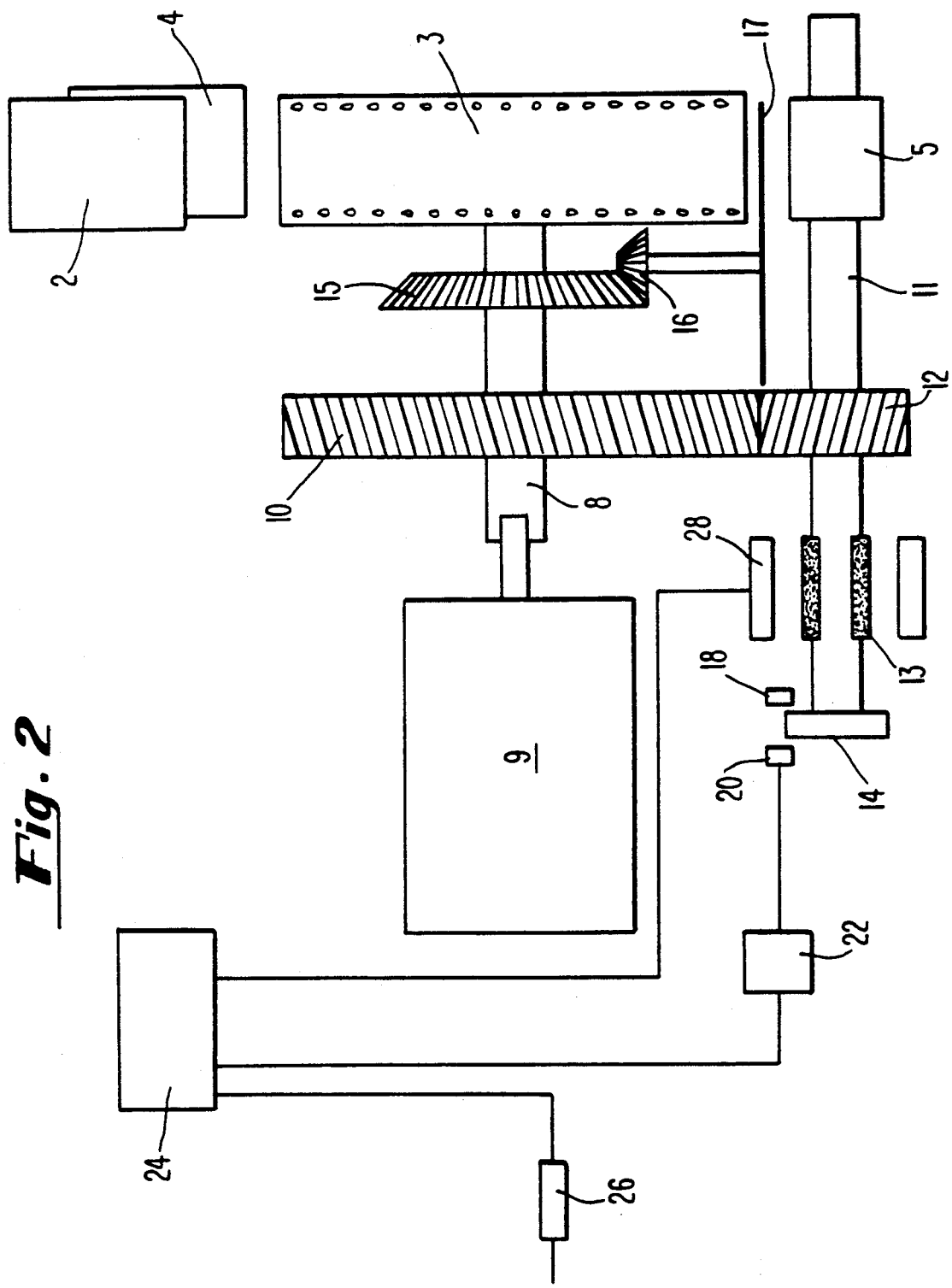
FIG. 2 is a schematic of the apparatus, which also includes a sectional view of the film driving mechanism.

According to FIG. 2 the sprocket wheel 3 is fastened to a shaft 8 which in turn is coupled to a motor 9. Shaft 8 drives gear 10, which intermeshes with a pinion 12 mounted to the shaft 11 which drives the rotating prism 5. Shaft 8 also drives gear 15, which in turn drives rotating shutter 17 via pinion 16 An electromagnetic brake 13 is attached to the shaft 11 of the rotating prism 5. Also attached to the shaft 11 is a toothed or punched disk 14 of a tachometer. The tachometer further comprises a light source 18 and a light detector 20, which detector is intermittently covered and uncovered by the teeth or punches of disk 14 so that the output signal of light detector 20 is a square wave having a frequency which is proportional to the speed of disk 14. The output signal of light detector 20 is transformed into a continuous signal at digital/analog (d/a) converter 22, which again is proportional to the speed of disk 14. The output signal of d/a converter 22 is compared at a comparator and switch circuitry 24 with a reference signal provided by a hand-controllable potentiometer 26. The ouput of circuit 24 is connected to coil 28 for control of the brake 13.

In operation, when motor 9 is turned on to start the camera, the output signal from d/a converter 22 continuously rises until it reaches the reference value provided by potentiometer 26, the output signal of which corresponds to the desired operational speed. At this time the comparator and switch circuitry 24 energizes the exciting coil 28 of the electromagnetic brake 13. The braking force of the electromagnetic brake 13, and thus the force with which the tooth profiles of the gear 10 and of the pinion 12 engage with each other, is thus adapted to the respective conditions via the reference control provided by potentiometer 26.

It is noted that whenever the output signal produced by the tachometer is higher than the value corresponding to the required rotational frequency of sprocket wheel 3 and rotating prism 5, the electromagnetic brake 13 is switched in automatically via the corresponding switching circuit, thereby causing the smooth meshing of the gear 10 and pinion 12.

What is claimed:

1. A high-frequency movie camera comprising a sprocket shaft and a sprocket wheel mounted on said sprocket shaft for supporting and transporting of a film, a rotating prism opposite to the perimeter of the sprocket wheel, said rotating prism being mounted on a prism shaft, a gear on the sprocket shaft and a pinion attached to said prism shaft and intermeshing with said gear,
   further comprising an electromagnetic brake mounted on said prism shaft, and means for energizing said brake so as to control said gear and pinion intermeshing.

2. The high-frequency movie camera according to claim 1, further comprising a tachometer mounted on said prism shaft for developing a signal representative of the rotational speed of said prism shaft.

3. The high-frequency movie camera according to claim 1, wherein said energizing means comprises means for switching said electromagnetic brake on and off.

4. The high-frequency movie camera according to claim 2, further comprising reference means for providing a reference signal representative of desired operating speed of said prism shaft.

5. The high-frequency movie camera according to claim 4, further comprising comparison means to develop a difference control signal, and connecting means for connecting said difference control signal to said energizing means.

6. A high-frequency movie camera having a sprocket wheel for supporting and transporting of a film and a rotating prism for directing light images onto the film,
   said camera having drive means for driving said prism in conjunction with said sprocket wheel, said drive means further comprising a gear intermeshed with a pinion, said gear and pinion having a predetermined clearance of their respective teeth therebetween, and
control means for controlling the rotational speed of said pinion when said camera is operating at at least a predetermined speed, thereby controlling the intermeshing of said gear and pinion.

* * * * *